United States Patent
Jalali (10) Patent No.: US 10,187,140 B2
(45) Date of Patent: Jan. 22, 2019

(54) UNMANNED AERIAL VEHICLE COMMUNICATION USING DISTRIBUTED ANTENNA PLACEMENT AND BEAM POINTING

(71) Applicant: Bridgewest Finance LLC, San Diego, CA (US)

(72) Inventor: Ahmad Jalali, Rancho Santa Fe, CA (US)

(73) Assignee: Bridgewest Finance LLC, San Diego, CA (US)

( * ) Notice: Subject to any disclaimer, the term of this patent is extended or adjusted under 35 U.S.C. 154(b) by 120 days.

(21) Appl. No.: 14/609,207

(22) Filed: Jan. 29, 2015

(65) Prior Publication Data
US 2015/0237569 A1     Aug. 20, 2015

Related U.S. Application Data (60) Provisional application No. 61/940,805, filed on Feb. 17, 2014, provisional application No. 61/946,575, filed on Feb. 28, 2014.

(51) Int. Cl.
*H04B 7/185* (2006.01)
*H04W 36/36* (2009.01)
(Continued)

(52) U.S. Cl.
CPC ....... *H04B 7/18504* (2013.01); *B64C 39/024* (2013.01); *H04B 7/1555* (2013.01);
(Continued)

(58) Field of Classification Search
CPC ........ B64C 2201/027; B64C 2201/141; B64C 2201/145; B64C 2201/143; H04B 7/18504; H04B 7/0617; H04W 16/28
See application file for complete search history.

(56) References Cited

U.S. PATENT DOCUMENTS

| | | | |
|---|---|---|---|
| 4,879,711 A | 11/1989 | Rosen | |
| 5,642,122 A | 6/1997 | Lockie et al. | |

(Continued)

OTHER PUBLICATIONS

Mohorcic et al. Broadband Communications from Aerial Platform Networks. Research Paper. Y 2004 [retrieved on Apr. 20, 2015]. Retrieved from the internet: <URL: 2-10 http://www.researchgate.net/profile/Mihael_Mohorcic/publication/215650814_Broadband_Communicationsfrom_Aerial_Platform_Networks/links/09e41510815e28b01b000000.pdf> entire document.

*Primary Examiner* — Jae Y Lee
*Assistant Examiner* — Aixa Guadalupe-Cruz
(74) *Attorney, Agent, or Firm* — Klein, O'Neill & Singh, LLP (57) ABSTRACT

A communication system is described. The system includes: at least one gateway able to provide broadband connectivity, a set of ground terminals, and a set of aerial platforms, where at least one aerial platform is able to communicate with at least one gateway using radio frequencies, each aerial platform is able to communicate with ground terminals using radio frequencies, and each aerial platform is able to communicate with each other aerial platform using radio frequencies. An automated method for determining a beam direction for communication among UAVs includes: dividing a space around the UAV into multiple sub-regions, and, iteratively: selecting a sub-region from among the multiple sub-regions; pointing a signal toward the sub-region; and determining whether a signal is received from another UAV, until all sub-regions from among the multiple sub-regions have been selected.

13 Claims, 9 Drawing Sheets

(51) Int. Cl.
*H04W 36/00* (2009.01)
*H04W 24/02* (2009.01)
*H04W 36/30* (2009.01)
*B64C 39/02* (2006.01)
*H04W 84/06* (2009.01)
*H04B 7/155* (2006.01)
*H04W 36/12* (2009.01)
*H04W 48/16* (2009.01)
*H04W 88/16* (2009.01)
*H04W 84/00* (2009.01)

(52) U.S. Cl.
CPC ..... *H04B 7/18506* (2013.01); *H04B 7/18528* (2013.01); *H04B 7/18539* (2013.01); *H04B 7/18541* (2013.01); *H04B 7/18543* (2013.01); *H04B 7/18554* (2013.01); *H04B 7/18578* (2013.01); *H04W 24/02* (2013.01); *H04W 36/0005* (2013.01); *H04W 36/0083* (2013.01); *H04W 36/30* (2013.01); *H04W 36/36* (2013.01); *H04W 84/06* (2013.01); *B64C 2201/122* (2013.01); *H04W 36/0016* (2013.01); *H04W 36/12* (2013.01); *H04W 48/16* (2013.01); *H04W 84/005* (2013.01); *H04W 88/16* (2013.01); *Y02D 70/00* (2018.01); *Y02D 70/1242* (2018.01); *Y02D 70/1262* (2018.01); *Y02D 70/142* (2018.01); *Y02D 70/164* (2018.01); *Y02D 70/446* (2018.01)

(56) References Cited

U.S. PATENT DOCUMENTS

| | | |
|---|---|---|
| 5,859,620 A | 1/1999 | Skinner et al. |
| 5,974,317 A | 10/1999 | Djuknic et al. |
| 6,018,659 A | 1/2000 | Ayyagari et al. |
| 6,061,562 A * | 5/2000 | Martin ............... H01Q 3/242 455/427 |
| 6,167,036 A | 12/2000 | Beven |
| 6,856,803 B1 | 2/2005 | Gross et al. |
| 7,123,919 B1 | 10/2006 | Driessen |
| 9,119,179 B1 * | 8/2015 | Firoiu ............... H04W 16/18 |
| 2002/0122412 A1 | 9/2002 | Chen et al. |
| 2002/0126042 A1 | 9/2002 | Chang et al. |
| 2004/0147222 A1 | 7/2004 | Walsh et al. |
| 2006/0223573 A1 | 10/2006 | Jalali |
| 2007/0177549 A1 | 8/2007 | Lo et al. |
| 2008/0001854 A1 | 1/2008 | Hamer et al. |
| 2010/0004012 A1 | 2/2010 | Sharma |
| 2013/0231106 A1 | 9/2013 | Knoblach et al. |
| 2013/0321214 A1 | 12/2013 | Zhou et al. |
| 2015/0203213 A1 * | 7/2015 | Levien ............... G01C 21/00 701/486 |

* cited by examiner

UNMANNED AERIAL VEHICLE COMMUNICATION USING DISTRIBUTED ANTENNA PLACEMENT AND BEAM POINTING

CROSS-REFERENCE TO RELATED APPLICATIONS

This application claims priority to U.S. Provisional Patent Application Ser. No. 61/940,805, filed on Feb. 17, 2014, and U.S. Provisional Patent Application Ser. No. 61/946,575, filed on Feb. 28, 2014.

BACKGROUND OF THE INVENTION

Many underdeveloped areas may not have access to broadband services such as satellite location services. Infrastructure expenses may prevent improvement in such areas.

Many aerial platforms such as airplanes and drones or Unmanned Aerial vehicles (UAVs) have been or will be deployed in various regions around the world for broadband access. Such platforms may be deployed in a more cost effective manner than typical satellite networks.

As internet traffic has increased over the years, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems and geo-stationary satellite systems. Current broadband access systems have a number of shortcomings. One issue is a lack of service in remote and lightly populated areas. Geo-stationary satellites do provide service in remote areas of developed world such as the United States. Poorer areas of the world, however, such as Africa lack adequate satellite capacity.

A notable reason satellite capacity has not been adequately provided in poor regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and high cost of satellites, there is a significant cost to insure the satellite and the launch. Therefore, broadband satellite systems and services are relatively costly and difficult to justify in poor regions of the world. It is also costly to deploy terrestrial systems such as fiber or microwave links in lightly populated regions. The small density of subscribers does not justify the deployment cost.

Thus, there is a need for an efficient way to provide broadband service to poor and lightly populated regions using aerial platforms.

BRIEF SUMMARY OF THE INVENTION

Some embodiments may provide communication pathways among a set of UAVs. Such pathways may include elements included in UAVs or ground terminals (GTs). The UAVs and/or GTs may be able to transmit and receive data in various directions using various sets of equipment. Some embodiments provide ways to align communication beams by selecting an appropriate path from among the available directions. Some embodiments may include distributed antenna placements that allow the elements to form coverage areas that surround parts or all of the elements.

The communications pathways may be used to implement networks among various existing network resources (e.g., Internet connections, cellular networks, etc.) and the resources provided by some embodiments (e.g., UAVs, GTs, etc.).

The preceding Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features. Broadly, some embodiments of the present invention generally provide a way to communicate among a set of aerial platforms and a set of ground terminals.

A first exemplary embodiment provides a communication system including: at least one gateway able to provide broadband connectivity; a set of ground terminals; and a set of aerial platforms, where at least one aerial platform is able to communicate with at least one gateway using radio frequencies, each aerial platform is able to communicate with ground terminals using radio frequencies, and each aerial platform is able to communicate with each other aerial platform using radio frequencies.

A second exemplary embodiment provides an automated method for determining a beam direction for communication among UAVs. The method includes: dividing a space around the UAV into multiple sub-regions; and iteratively, until meeting some specified criteria: selecting a sub-region from among the multiple sub-regions; pointing a signal toward the sub-region; and determining whether a signal is received from another UAV.

A third exemplary embodiment provides an automated method for determining a beam direction for communication within an aerial communication system. The method includes: dividing a space around an aerial platform into multiple sub-regions; and iteratively, until meeting some specified criteria: selecting a sub-region from among the multiple sub-regions; searching, within the sub-region, for a signal from the aerial platform; and determining whether a signal has been detected.

Such aerial platforms may include, for instance, drones, UAVs, balloons, blimps, airships, etc. Each platform may include propulsion elements, fuel systems, navigational elements, control systems, etc. In some embodiments, a drone may include a fixed wing fuselage in combination with a propeller and/or other appropriate elements. In some embodiments, a UAV may be a robo-copter or similar device. Each UAV may carry fuel and/or use solar energy (or other alternatives). Throughout this disclosure, the terms "UAV", "aerial platform", and/or "drone" may be used to refer to any aerial platform including those described above and other appropriate aerial platforms.

Figure 1:
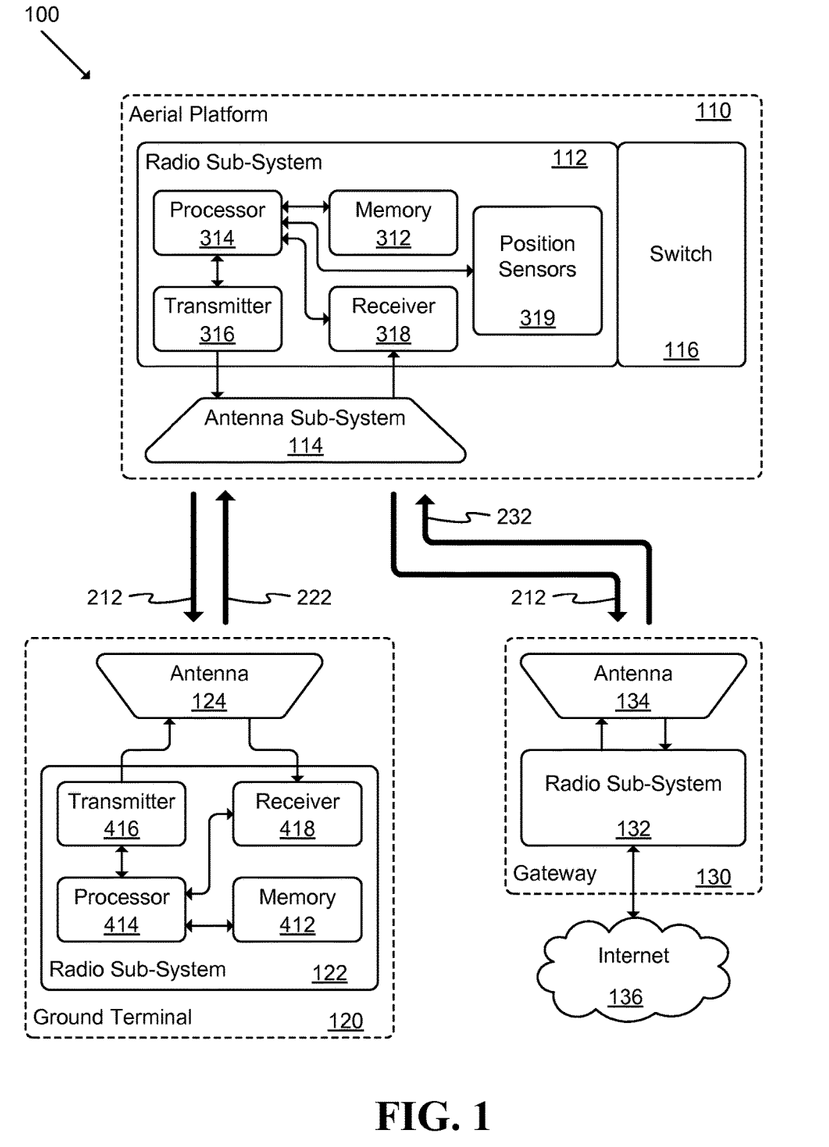
FIG. 1 illustrates a schematic block diagram of an aerial platform based communications system of some embodiments.

FIG. 1 illustrates a schematic block diagram of an aerial platform based communications system 100 of some embodiments. As shown, the system may include at least one aerial platform or drone 110, ground terminal 120, gateway 130, and internet or other appropriate network 136 access.

Each aerial platform 110 may include a radio sub-system 112, at least one antenna aperture sub-system 114, and a message switch sub-system 116. Depending on the altitude of the drone 110, each drone may be associated with an area on the ground having a particular radius (e.g., ranging from tens of kilometers to two hundred kilometers or more). Each drone may communicate with various types of ground terminals. Example system 100 includes a ground terminal (GT) 120 and a gateway (GTW) 130. The system 100 may provide a communications network across which the UAVs 110, GTs 120, GTWs 130, and/or other elements may communicate with other system entities.

As shown, the radio sub-system 112 may include multiple sub-systems. Receiver 318 may be able to demodulate and decode signals received via antenna sub-system 114. Transmitter sub-system 316 may be able to modulate the data received from processor 314 and send the resulting signal through antenna sub-system 114. Processor sub-system 314 may be able to carry out functions such as configuring the receiver 318 and transmitter 316 sub-systems, processing the data received from the receiver 318 sub-system, determining the data to be transmitted through the transmitter sub-system 316, and/or controlling the antenna sub-system 114. Memory sub-system 312 may be able to store data such as, for instance, program code, configuration data, and system parameter information used to control the operations of processor 314. Position sensors sub-system 319 may be able to determine the position and orientation (e.g., roll and pitch) angles of the UAV 110. The sub-system 319 may include sensor elements such as gyroscopes, accelerometers, a global positioning system (GPS) receiver, etc.

A GT 120 may be a terminal that is able to provide Internet connectivity to a home, enterprise, mobile device, or other appropriate resource via one or more aerial platforms 110. The GTW 130 may be a network-connected device that is able to provide access to the Internet.

Each GT 120 may transmit and receive data from Internet-connected resources using the drone 110 as an intermediary. The radio sub-system 112 may aggregate traffic received from multiple GTs 120 and send the aggregated data to a set of Internet resources via one or more GTWs 130. Therefore, the GTWs need to provide much higher data rates with respect to drones 110 than the GTs 120 provide. Thus the gain of a GTW 130 antenna sub-system must be larger than that of the GT 120 antenna sub-system, and a GTW 130 transmitter must transmit at higher power than the GT 120 transmitter.

The term "GT" may be used throughout the specification to refer to GTs 120 and GTWs 130 when describing elements or features that apply to both GTs 120 and GTWs 130. In addition, the term "GT" may refer to other types of ground terminals (e.g., relay gateway 140 described below in reference to FIG. 2).

As shown in FIG. 1, each GT 120 may include two main sub-systems: a radio sub-system 122, and an antenna sub-system 124. The radio sub-system 122 may include sub-elements similar to those described above in reference to radio sub-system 112.

As shown, the radio sub-system 122 may include multiple sub-systems. Receiver 418 may be able to demodulate and decode signals received from drone antenna sub-systems 114 via antenna 124. Transmitter sub-system 416 may be able to modulate data received from processor 414 and send the resulting signal through antenna sub-system 124. Processor sub-system 414 may be able to carry out functions such as configuring the receiver 418 and transmitter 416 sub-systems, processing the data received from the receiver 418 sub-system, determining the data to be transmitted through the transmitter sub-system 416, and/or controlling the antenna sub-system 124. Memory sub-system 412 may be able to store data such as, for instance, program code, configuration data, and system parameter information used to control the operations of processor 414.

Each GT 130 may include two main sub-systems: a radio sub-system 132, and an antenna sub-system 134. The radio sub-system 132 may include sub-elements similar to those described above in reference to radio sub-system 112 or radio system 122. The radio sub-system may include similar sub-systems to those described above in reference to radio sub-system 122.

Figure 2:
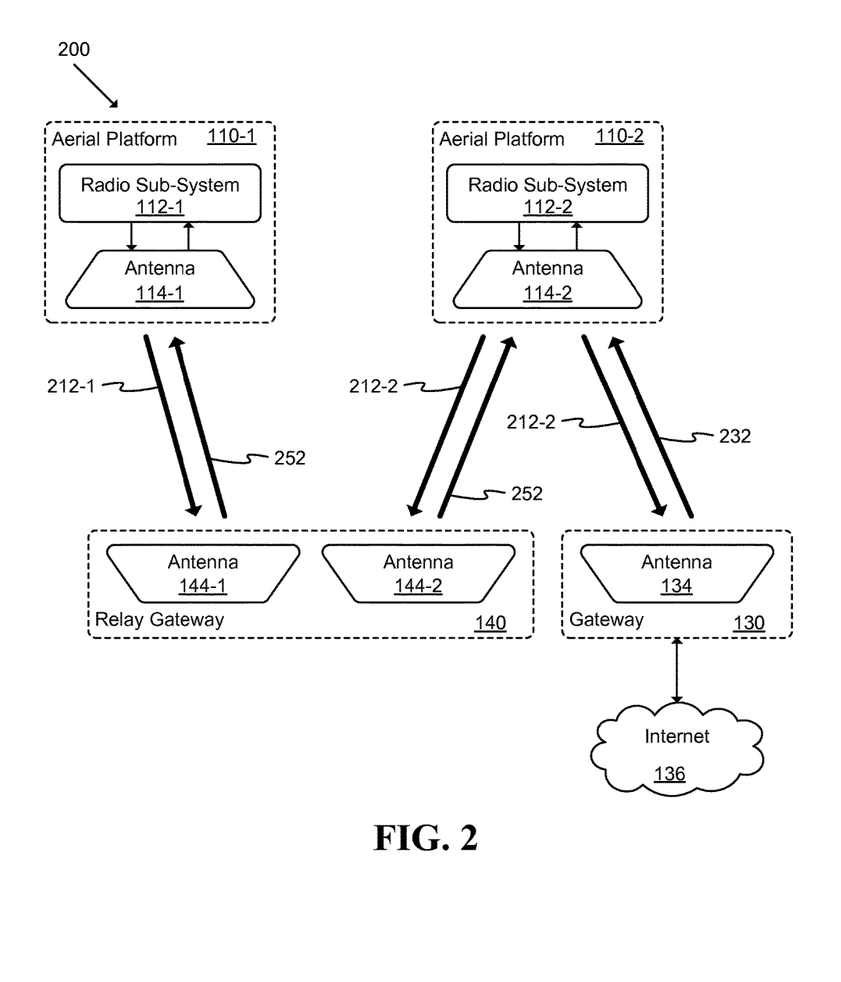
FIG. 2 illustrates a schematic block diagram of an aerial platform system of some embodiments that is able to connect aerial platforms to other aerial platforms and/or GTs.

FIG. 2 illustrates a schematic block diagram of an aerial platform system 200 of some embodiments that is able to connect aerial platforms 110 to other aerial platforms and/or GTs. In this example, aerial platforms 110 may be connected using a relay gateway 140. Such relay gateways, in addition to antenna sub-systems 144-1 and 144-2, may include various other components similar to ground terminal 120 described above.

Relay gateway 140 may form beams toward UAVs 110-1 and 110-2 in order to relay data packets from one UAV to another. Because UAVs move in their respective orbits, the beam from each UAV antenna sub-system 114 must be steered toward the relay gateway 140. The UAV antenna sub-system 114 may be capable of forming beams toward all possible locations of gateways 130 or relay gateways 140 in the ground coverage area of the UAV. Various arrangements are described below in reference to FIGS. 4A-4C.

During initial connection set up between a UAV radio sub-system 112 and a gateway radio sub-system 132, the UAV radio sub-system 112 must determine a direction to point a beam toward the gateway 130. In some embodiments, the UAV radio sub-system 112 is able to retrieve position coordinates of the UAV 110 as well as position coordinates of the gateway 130. Each UAV 110 may be configured with the position coordinates of the gateway 130 before the UAV 110 is launched. Alternatively, the position coordinates of the UAV 110 may be sent to the UAV during a system initialization phase using of one a number of schemes as described below in reference to FIG. 5. Based on the position coordinates of the UAV 110 and the gateway 130 and orientation angles of the UAV 110, the UAV radio sub-system 112 may determine the direction toward which to form a beam at the gateway and instruct the antenna sub-system 114 to form a beam accordingly.

Figure 3:
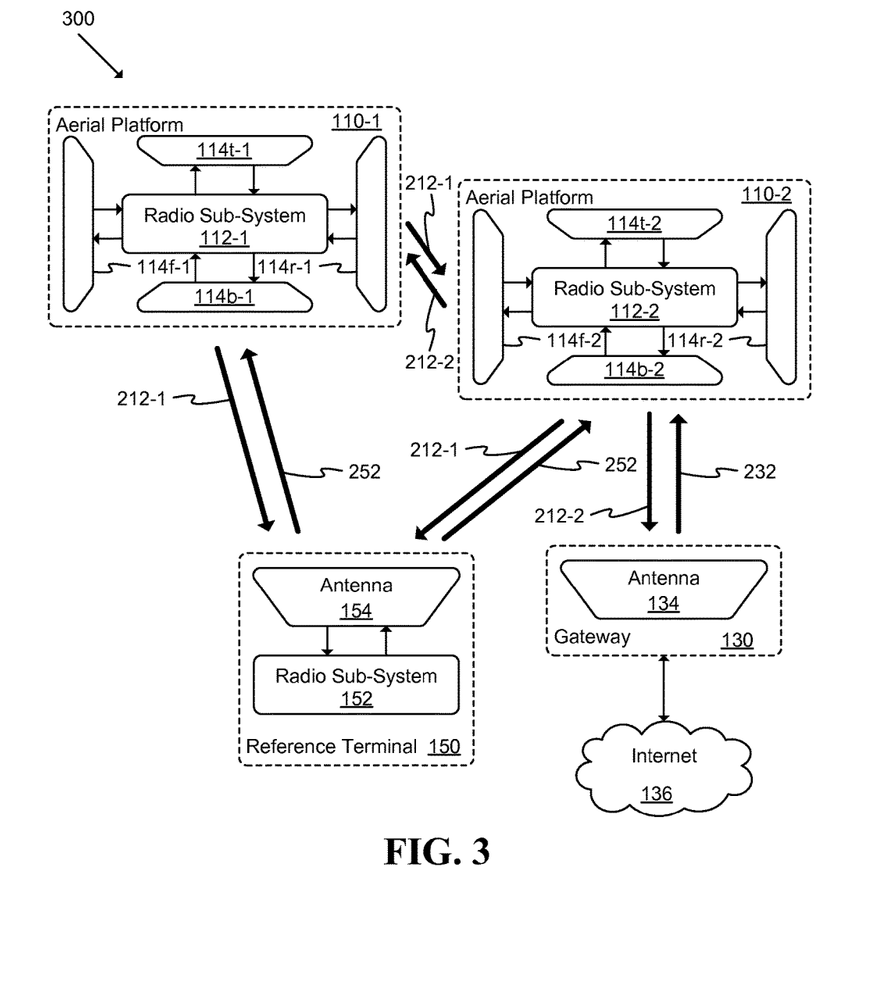
FIG. 3 illustrates a schematic block diagram of an alternative aerial platform system of some embodiments that is able to connect aerial platforms to other aerial platforms and/or GTs.

FIG. 3 illustrates a schematic block diagram of an alternative aerial platform system 300 of some embodiments that is able to connect aerial platforms 110 to other aerial platforms and/or GTs. In this way, a network of aerial platforms may be formed.

There are a number of challenges in establishing a communications link between two UAVs. For example, although two UAVs may be cruising at the same altitude if each UAV only has antennas deployed underneath the UAVs, the beams between the UAVs need to be pointed toward the horizon, and any roll and/or pitch of either UAV may obstruct the view of the beams. Moreover, the gain of the UAV antennas toward the horizon may be too low to establish a connection with high enough data rates.

Multiple antenna apertures on a UAV may be needed to provide coverage to gateway locations that are far from the UAV (e.g., one hundred kilometers or more). Multiple antennas may be placed at different locations on the UAV to cover all locations in a three hundred sixty degree azimuth from the UAV even when the UAV is undergoing large pitch and roll angles. Antenna apertures may be installed in different locations on the UAV to cover all possible locations within the desired coverage area on the ground as well as between two UAVs for all UAV positions and/or roll and pitch angles.

Some embodiments may include multiple antennas installed on different locations of the fuselage of the UAV 110. For example, antenna apertures may be placed on two sides, front, and rear of the fuselage. Because the fuselage is generally curved, multiple rows of antenna apertures may be installed at different heights in order to better cover locations at different elevation angles. Multiple rows of antenna apertures may be installed around the fuselage of the UAV, with each antenna aperture pointing a beam toward a specific direction, such that all apertures together provide a desired converge area (e.g., an area around a GT or other UAV).

In some embodiments, the antenna apertures may be placed inside the fuselage, in which case a material that is transparent to radio frequency propagation must be used around the fuselage where the antenna apertures are placed. When antenna apertures are installed outside of the surface of the fuselage, the antenna apertures must have a very low profile in order to be highly aerodynamic (e.g., an array of patch antennas printed on a substrate).

In the example of system 300, each UAV 110 may include multiple antennas 114 (e.g., f—front, r—rear, t—top, b—bottom, etc.). Placing antennas at different locations of the UAV 110 ensures that there is a line of sight between at least one antenna on a first UAV 110-1 and one antenna on a second UAV 110-2. If antennas are placed only at the top and the bottom of UAVs, there may be cases where there is no clear line of sight between antennas of one UAV and those of a second UAV. One such case may occur when the two UAVs are cruising at the same altitude, where the antennas of the two UAVs would be pointing at each other along the horizon there may be blockage due to the structure of the UAVs. In addition, gain toward the horizon of the UAV antennas may be reduced compare to gain from other directions. One approach to improve the antenna gain and visibility between two UAVs would be to choose different cruising altitudes for the different UAVs.

In example of FIG. 3, antenna sub-system 114$b$-1 of UAV 110-1 and antenna sub-system 114$t$-2 of UAV 110-2 may be the best candidates for communications between the two UAVs in the UAV positions shown, where the second UAV 110-2 is represented at a lower altitude than the first UAV 110-1. In some embodiments, each UAV radio sub-system may have access to position coordinates of all UAVs in the network with which the sub-system may establish a link. The location of the UAVs may be computed, for example, using a satellite based position system such as the GPS system, by triangulating signal time of arrival measurements received by a UAV from multiple ground terminals, and/or other appropriate ways. The location may be calculated by the UAV, at a GT, at a remote server, or another appropriate resource. The orientation angles may be calculated by the UAV or another appropriate resource.

If calculated at the UAV, then the UAV may send position and orientation information to a GT in the coverage area of the UAV. The position and/or orientation information related to each UAV may be sent to all UAVs in the network either via a connection between UAVs, via ground reference terminals (RTs) 150, or via another appropriate resource. For instance, at the initial establishment of the network, each UAV may transmit position coordinates to a corresponding RT. The RT may be located in an area where the RT is able to communicate with multiple UAVs 110-1 and 110-2. The RT 150 may receive position coordinates of each UAV 110-1 and 110-2 via messages 212-1 and 212-2, respectively. In some embodiments, the antenna sub-system 154 forms a wide beam to cover the target UAVs with which the RT intends to communicate without needing to search for the best direction toward which to point the beam. Such a reference terminal with wide beam width may be used to send system parameters to the UAVs 110 in order to initialize the system may be referred to as the system initialization radio link.

After receiving position and/or orientation information, each UAV may select the antenna sub-system 114 that provides the best coverage toward another UAV. For instance, in the example of FIG. 3, antenna sub-system 114$r$-1 of UAV 110-1 may provide a clear line of sight, and the best coverage, to UAV 110-2 while antenna sub-system 114$f$-2 of UAV 110-2 may provide the best coverage toward UAV 110-1. Each UAV radio sub-system 112 may select the "best" antenna sub-system to communicate with another UAV 110 based on the position and orientation information. Each UAV may then point a beam toward another UAV using the selected antenna sub-system and search for reference signals sent by the second UAV.

Figure 4A:
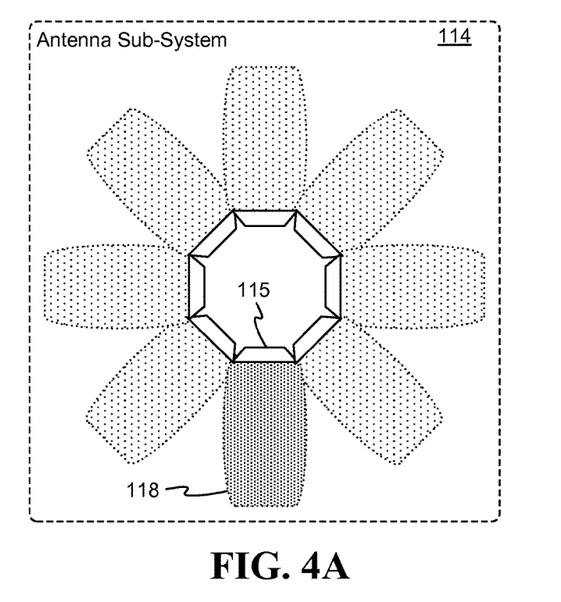
FIGS. 4A-4C illustrate two-dimensional views of various antenna sub-system arrangements of some embodiments.
Figure 4B:
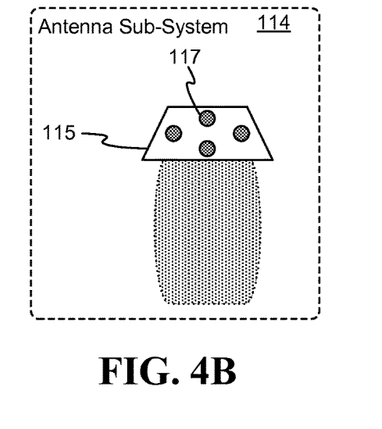
Figure 4C:
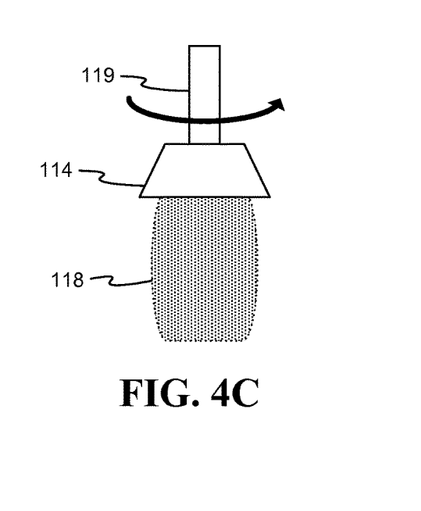

FIGS. 4A-4C illustrate two-dimensional views of various antenna sub-system 114 arrangements of some embodiments. Such arrangements may be used to allow UAV-UAV communication as described above in reference to FIG. 3.

Any of the antenna arrangements illustrated by FIGS. 4A-4C may be used to form beams from a first UAV 110-1 toward a second UAV 110-2. After each UAV has detected a reference signal from another UAV, the UAVs may establish a connection using messages 212-1 and 212-2. Because the UAVs move in individual cruising orbits and change orientation the position and orientation information of each UAV may be periodically updated and sent to other UAVs. Based on the updated of position and orientation information, each UAV may adjust the beam(s) sent toward other UAV(s). Depending on the change in position and orientation information, a UAV may select a different antenna sub-system to form a beam toward another UAV.

The example antenna sub-system 114 of FIG. 4A includes multiple sub-apertures 115, each capable of forming a beam 118 in a predetermined direction. The beams may be oriented to collectively generate a coverage area with particular attributes (e.g., a circular coverage area when viewed from the perspective of FIG. 4A). In this example, a single sub-aperture 115 is active and producing a beam 118 (as indicated by a first fill pattern) while all other sub-apertures 115 are inactive and not producing a beam 118 (as indicated by a second fill pattern). The radio sub-system 112 may select the aperture 115 and associated beam 118 that best covers the GT (or other UAV) according to various appropriate criteria (e.g., received signal strength at the GT radio sub-system 122 or other UAV radio sub-system 112). If the antenna sub-system 114 needs to communicate with multiple GTs and/or UAVs, then multiple beams may be formed simultaneously.

The example antenna sub-system 114 of FIG. 4B allows multiple beams to be formed using a phased array. The array includes multiple antenna elements 117 that are able to electronically form beams in different directions. At any given time only a subset of the beams may be active (e.g., a single beam may be active). Antenna sub-system 114 may electronically form a beam in the direction determined by the radio sub-system 112 by activating the appropriate element(s) 117.

The example antenna sub-system 114 of FIG. 4C may use a mechanical beam steering scheme to point the beam 118 toward the gateway. The antenna fixture 114 may be steered in multiple dimensions using the mechanical structure 119, which may be controlled by radio sub-system 112.

The beam 118 may be pointed toward the direction of the other system resource as determined by the radio sub-system 112. As the UAV 110 cruises in an orbit and the position and orientation changes (e.g., based on information received from the position sensors 319) the radio sub-system 112 may re-calculate and update the position and orientation information. The processor sub-system 314 may, in turn, use the calculated information to determine the appropriate direction toward which to point the beam 118. The processor sub-system 314 may then send the direction to the antenna sub-system 114.

One of ordinary skill in the art will recognize that the example systems described above in reference to FIGS. 1-4 may be implemented in various different ways without departing from the spirit of the disclosure. For instance, some embodiments may include various additional elements, omit various elements, and/or re-arrange the described elements.

Figure 5:
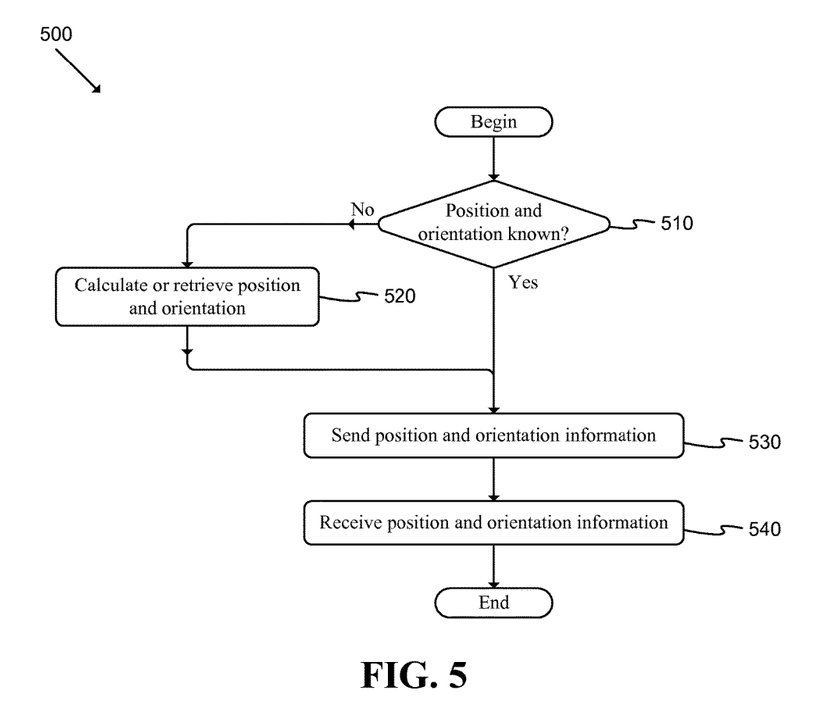
FIG. 5 illustrates a flow chart of a conceptual process used by some embodiments to initialize the communication network.

FIG. 5 illustrates a flow chart of a conceptual process 500 used by some embodiments to initialize the communication network 100. The process may be performed by system elements such as UAVs 110, ground terminals 120, 130, 140, and/or sub-elements thereof. The process may begin, for instance, when an aerial platform 110, GT, or other appropriate system element powers on.

As shown, the process may determine (at 510) whether position and/or orientation are known. Such position and orientation may refer to the attributes of the entity performing the process. If the process determines (at 510) that the position and orientation are not known, the process may calculate or retrieve (at 520) the position and orientation information. Such information may be generated by an internal system (e.g., using position sensors) or retrieved from an external resource (e.g., a GT or UAV).

After calculating or retrieving (at 520) the position and orientation information, or after determining (at 510) that the position and orientation are already known, the process may send (at 530) the position and orientation information to other system entities (e.g., UAVs, GTs, etc.). The process may then receive (at 540) position and orientation information from the other system entities and then may end. Such information may be received from multiple other entities (e.g., multiple UAVs) or information related to multiple entities may be received from a single source (e.g., information regarding multiple UAVs and/or GTs may be received from a single GT).

The position and orientation information (related to the entity performing the process and/or other entities) may be used to update the antenna configuration (e.g., selection of antenna aperture, designation of beam direction, etc.), as appropriate.

For instance, the position coordinates and orientation angles of the UAVs may first be sent to a reference terminal 150 (or other resource) using messages 212. The reference terminal 150 may, in turn, relay the information to other UAVs using messages 252 (and/or to other resources).

In some cases, it may not be feasible to provide a reference terminal that has coverage to multiple UAVs. One such situation occurs when UAVs are used to cover an area over the ocean. To cover such an area, a network of UAVs may be used to relay data from one UAV to the next until reaching a UAV with access to a terminal. In this case, UAV position information may be sent to (and/or received from) the other UAVs in the network via satellite links or using links to buoys or selected ships or vessels. Alternatively, UAVs may send position and orientation information to other UAVs via direct communication links.

Figure 6:
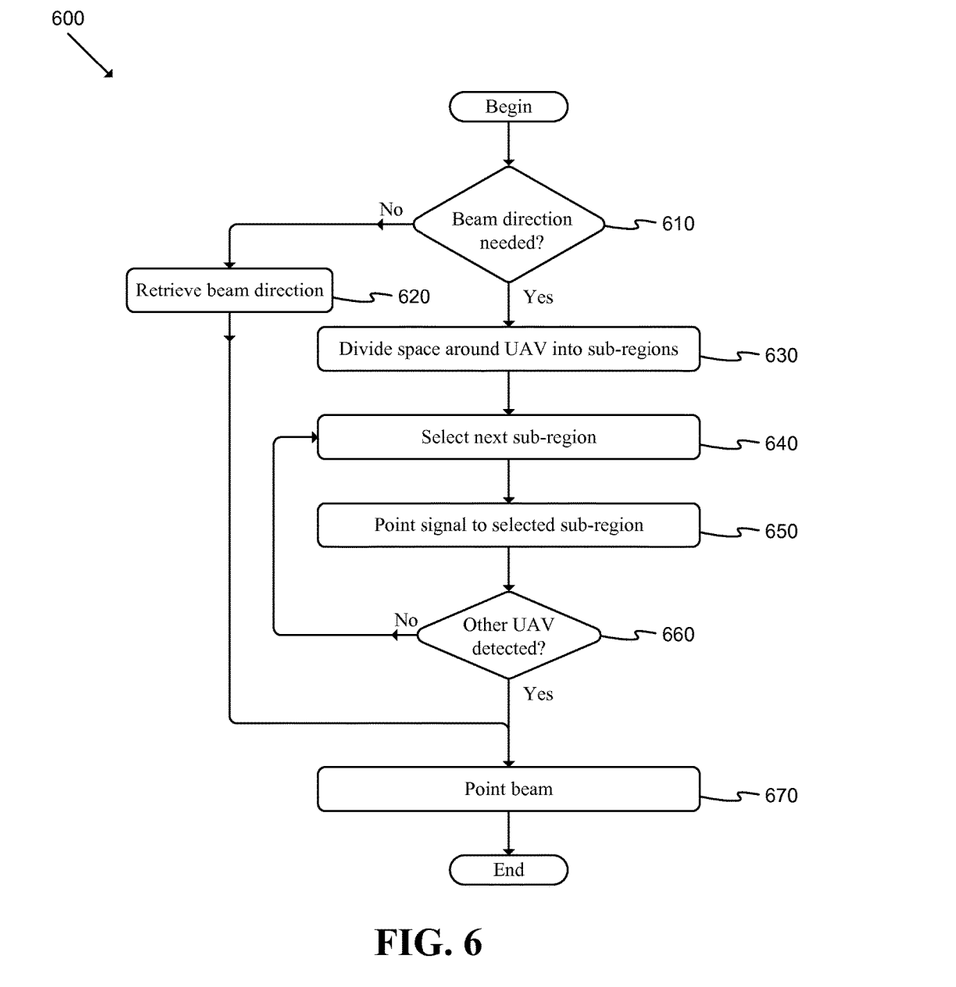
FIG. 6 illustrates a flow chart of a conceptual process used by some embodiments to select aligned beam pairs among UAVs.

FIG. 6 illustrates a flow chart of a conceptual process 600 used by some embodiments to select aligned beam pairs among UAVs. The process may be performed by a UAV 110, sub-elements thereof, and/or other appropriate elements. The process may begin, for instance, after process 500 has been completed.

Next, process 600 may determine (at 610) whether a beam direction is needed. At system initialization, the UAVs may not be aware of the position and orientation of other UAVs and may not be able to accurately point a beam toward another UAV. Alternatively, the beam direction information may have been sent (or is available to be requested) from a terminal. If the process determines (at 610) that the beam direction is not needed, the process may retrieve (at 620) the beam direction (e.g., from memory, by requesting the direction from another system element, etc.).

If the process determines (at 610) that the beam direction is needed, the process may then divide (at 630) the space around the UAV into sub-regions. Each UAV may divide the three dimensional space around the UAV into multiple sub-regions. The size of each sub-region may be chosen such that the beams formed by the UAV antenna sub-systems oriented toward each sub-region will adequately cover the sub-region. As one example of sub-region division, the whole three dimensional area around the UAV may be defined as one sub-region in which case the beam that covers the sub-region would need to be an omni-directional beam. In a second example of sub-region division, the whole three dimensional area around the UAV may be divided into two sub-regions, one covering the upper hemisphere, and the other the lower hemisphere around the UAV.

Next, the process may select (at 640) a next available sub-region (or initial sub-region at the first iteration) and point (at 650) a signal toward the selected sub-region. The initial sub-region may be selected based on various appropriate criteria (e.g., random selection, default selection, last known direction, etc.). The process may then determine (at 660) whether another UAV (or other appropriate resource) has been detected in the selected sub-region. Such a determination may be made in various appropriate ways (e.g., by determining whether a reference signal 212 has been received from another UAV).

If the process determines (at 660) that no other UAV has been detected, the process may repeat operations 640-660 until the process determines (at 660) that another UAV has been detected. Alternatively, the process may repeat operations 640-660 until all sub-regions have been evaluated.

Some embodiments provide ways to minimize the number of iterations to align the beams. In some embodiments, each UAV may be in one of two modes at a given time (e.g., listen mode or inquire mode). Each mode may be associated with an interval that includes a number of time slots at least equal to the number of UAV sub-regions. Each time slot may be long enough that other UAV radio sub-systems are able to detect the reference signal when the beams of the two UAVs are aligned. A frame including a number of intervals at least equal to the number of UAV sub-regions may define the time a UAV remains in a given mode.

In some embodiments, the clocks of the two UAVs are synchronized so that the listen and inquire frame time boundaries of the different UAVs are aligned. In other words, the first UAV enters listen mode at the same time that the second UAV enters inquire mode.

The UAV in inquire mode may point a beam toward a different sub-region during each of the inquire interval time slots, while transmitting a reference signal during each time slot. During each inquire interval a UAV will thus transmit reference signals on all sub-regions. During each listen mode, a UAV may point a beam toward a sub-region and search for reference signals sent by another UAV in inquire mode. If, after a listen interval, the UAV in listen mode does not detect a reference signal from another UAV, the first UAV may switch the beam to another sub-region for the next listen interval. During each listen frame, all possible beam pairs are evaluated and the best beam pair on which to communicate may be identified, if the UAVs are in different modes.

Some embodiments provide a way to ensure that at least during one listen/inquire frame one UAV is in listen mode and the second UAV is in inquire mode. One solution is for each UAV to choose the listen or inquire mode at random during each frame. After a relatively small number of frames, there will be a high probability that the two UAVs were in different modes for at least one frame.

In some embodiments, the UAV radio sub-system may include a dedicated system configuration radio link (SCRL). The SCRL may be able to configure the mode of each UAV and send other system parameters among UAVs. The SCRL beam may have a wide beam width that illuminates a wide area. As an example, the SCRL beams may cover at least one quarter of the hemispherical area around a UAV. Each UAV may monitor the SCRL beams in order to detect the presence of a neighboring UAV using the SCRL and two neighboring UAVs may use the SCRL to send messages to configure one UAV to be in listen mode and the second UAV to be in the inquire mode during a given frame. The two UAVs may use the configuration radio link to establish a communication path over which to send system parameter and configuration messages to each other to establish which UAV will be in listen mode and which in inquire mode before selecting the best beam pair.

The frame boundaries of UAVs may be synchronized using SCRL messaging. In situations where the frame boundaries are not able to be synchronized, each frame may include a number of intervals equal to two times the number of sub-regions.

If the process determines (at 660) that another UAV has been detected or after retrieving (at 620) the beam direction, the process may point (at 670) the beam in the retrieved direction or toward the selected sub-region, as appropriate and then may end. If no other UAV is detected (at 660), the process may continue re-evaluating sub-regions until a UAV is identified or some other criteria is met (e.g., a beam direction is able to be received from another resource).

Referring to the example of FIG. 3, if the sub-region toward which the first UAV 110-1 is pointing a beam happens to be aligned with a beam from the second UAV 110-2, then each UAV will detect the reference signal of the other UAV. However, if the beam formed by the first UAV 110-1 is not aligned with a beam formed by the second UAV 110-2, then the first UAV 110-1 will not detect the reference signal 212-2 sent by the second UAV 110-2. Likewise, the second UAV 110-2 will not detect the reference signal 212-1 sent by the first UAV 110-1. In this case, process 600 may cause each UAV to select a different sub-region toward which to point a beam. However, if the two UAVs choose new sub-regions at random, it may take an excessive number of iterations before the beams are aligned.

Figure 7:
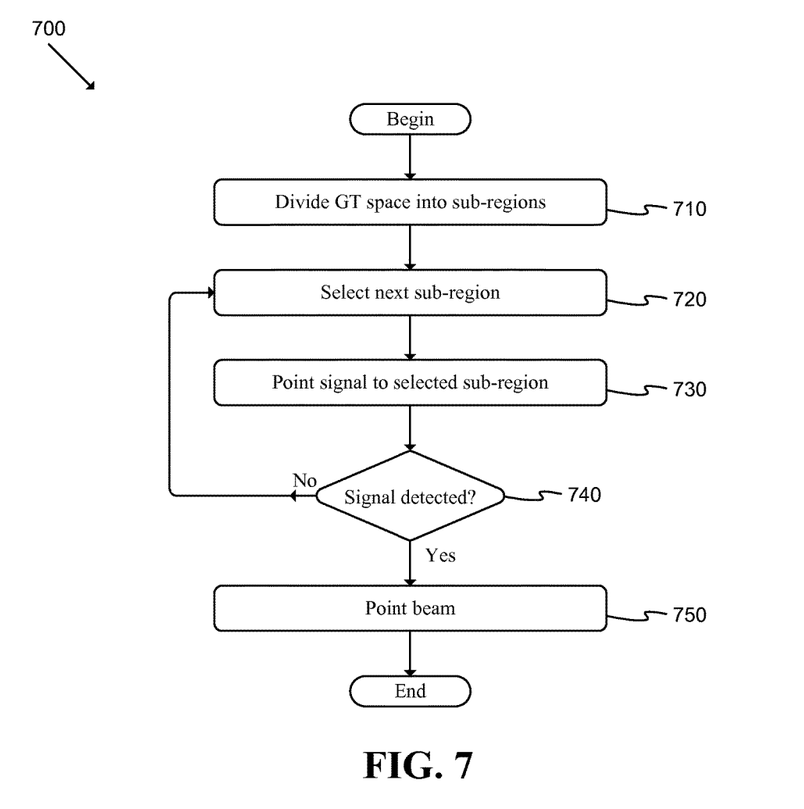
FIG. 7 illustrates a flow chart of a conceptual process used by some embodiments to select an aligned beam pair from a UAV to a GT.

FIG. 7 illustrates a flow chart of a conceptual process 700 used by some embodiments to select an aligned beam pair from a UAV to a GT. The process may be performed by a UAV 110, sub-elements thereof, and/or other appropriate elements. Such a process may begin, for instance, when such information is not able to be ascertained based on data received during process 500.

Next, process 700 may divide (at 710) the three dimensional space in which the GT (or gateway) may be located into a number of sub-regions. Next, the process may select (at 720) a next available sub-region (or initial sub-region at the first iteration) and point (at 730) and transmit a reference signal toward the selected sub-region (e.g., for one time slot before moving to a different sub-region). The initial sub-region may be selected based on various appropriate criteria (e.g., random selection, default selection, last known direction, etc.).

The process may then determine (at 740) whether a GT (or other appropriate resource) has detected the reference signal. Such a determination may be made in various appropriate ways (e.g., by determining whether a confirmation message has been received from the GT).

If the process determines (at 740) that no GT has detected the reference signal, the process may repeat operations 720-740 until the process determines (at 740) that a GT has detected the reference signal. Alternatively, the process may repeat operations 720-740 until all sub-regions have been evaluated.

If the process determines (at 740) that a GT has detected the reference signal, the process may point (at 750) the beam toward the selected sub-region and then may end.

Figure 8:
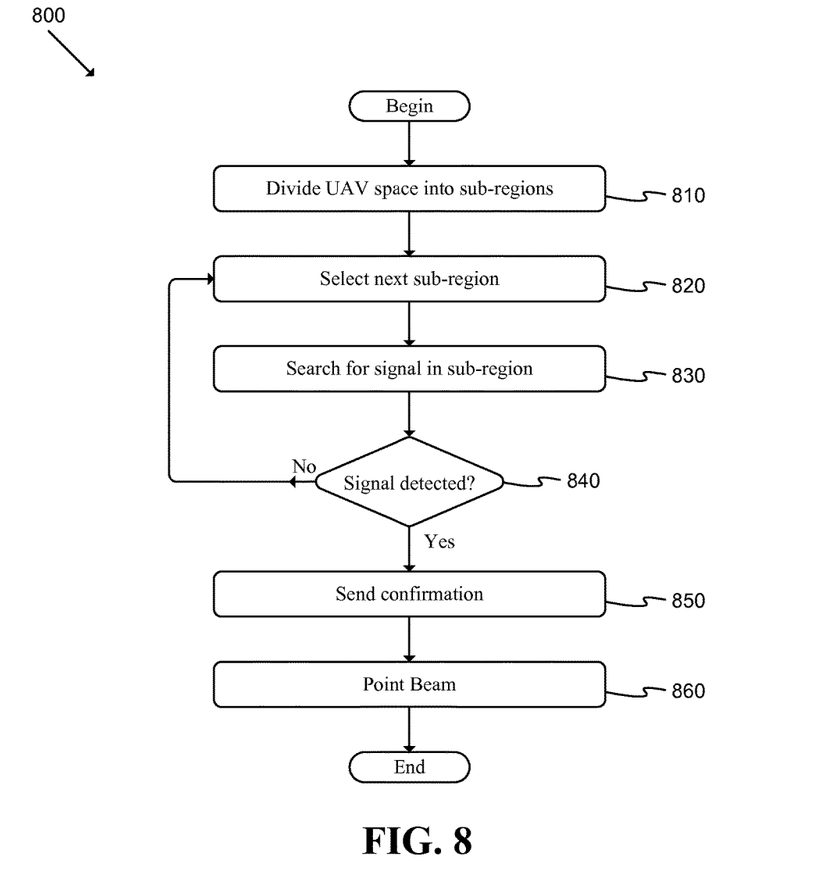
FIG. 8 illustrates a flow chart of a conceptual process used by some embodiments to select an aligned beam pair from a GT to a UAV.

FIG. 8 illustrates a flow chart of a conceptual process 800 used by some embodiments to select an aligned beam pair from a GT to a UAV. The process may be performed by a ground terminal 120, gateway 130, sub-elements thereof, and/or other appropriate elements. Such a process may begin, for instance, when such information is not able to be ascertained based on data received during process 500.

Next, process 800 may divide (at 810) the three dimensional space in which a UAV may be located into a number of sub-regions. Next, the process may select (at 820) a next available sub-region (or initial sub-region at the first iteration) and search (at 830) for a reference signal in the selected sub-region (e.g., for a listen time interval). The gateway listen time interval may include a number of time slots at least equal to the number of UAV sub-regions. Each time slot time duration may be long enough that if the UAV and the gateway beams align, the gateway radio sub-system will be able to detect the reference signal sent by the UAV.

The process may then determine (at 840) whether a reference signal has been detected. Such a determination may be made in various appropriate ways. If the process determines (at 840) that no reference signal has been detected, the process may repeat operations 820-840 until the process determines (at 840) that a reference signal has been detected. Alternatively, the process may repeat operations 820-840 until all sub-regions have been evaluated.

If the process determines (at 840) that the reference signal has been detected, the process may send (at 850) a confirmation message to the UAV associated with the reference signal, point (at 860) the beam toward the selected sub-region, and then end.

The gateway listen time interval may be at least equal to the number of UAV sub-regions, such that the gateway is able to detect the UAV reference signal in one of the time slots of the listen period. If the gateway beam is not pointed toward the UAV, the gateway antenna sub-system may point a beam to a different gateway sub-region during the next gateway listen time interval. During the gateway listen time interval, the gateway beam may be focused toward one sub-region, while the UAV sweeps through all sub-regions. After at most a number of gateway listen time intervals equal to the number of gateway sub-regions, the UAV and gateway beams will at least partially align and the gateway will detect the UAV reference signal.

Once the gateway and the UAV radio sub-systems align their respective beams and establish a connection as described above, the UAV and the gateway antenna sub-systems may adjust their beams to optimize performance based on some set of criteria (e.g., received signal strength as the UAV cruises in orbit).

One of ordinary skill in the art will recognize that processes 500-800 are conceptual in nature and may be performed in various different ways without departing from the spirit of the disclosure. For instance, different embodiments may include various different operations, may omit various operations, and/or perform operations in a different order. As another example, each process may be divided into a set of sub-processes or included within a macro-process. The processes may be performed iteratively, based on some criteria, and/or based on other relevant factors.

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 9:
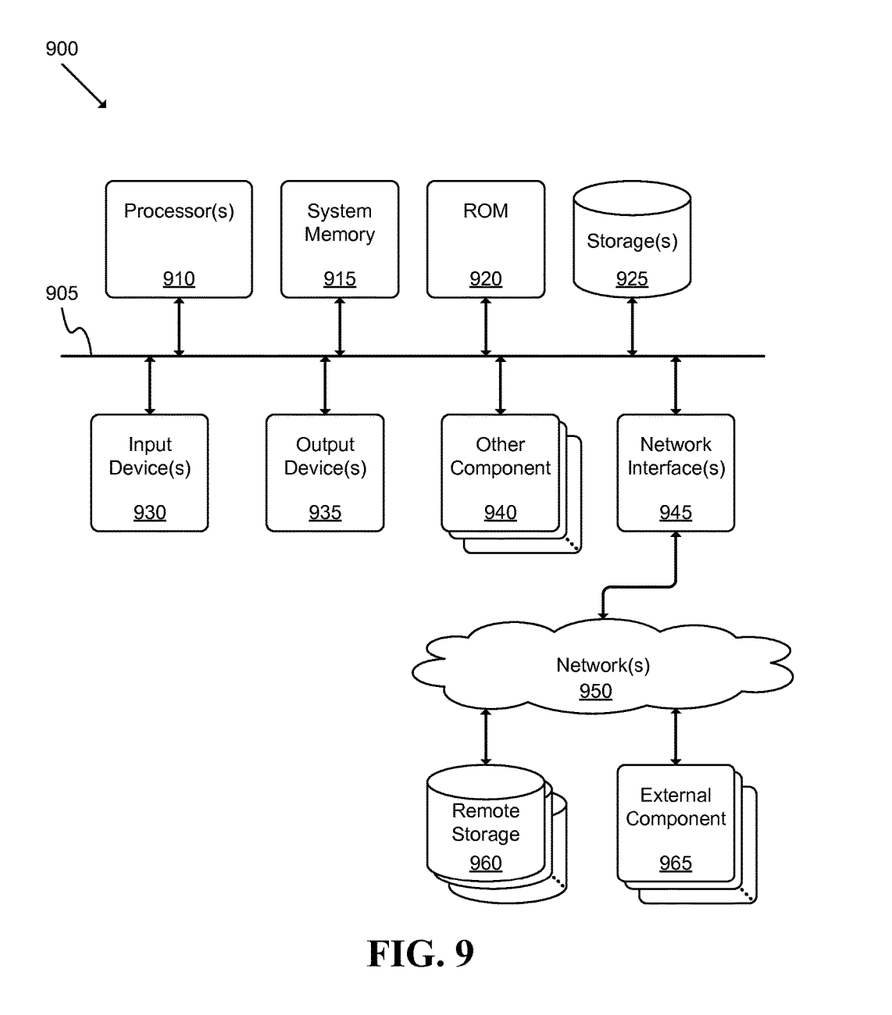
FIG. 9 illustrates a schematic block diagram of a conceptual computer system used to implement some embodiments of the invention.

FIG. 9 illustrates a schematic block diagram of a conceptual computer system 900 used to implement some embodiments. For example, an interactive display, motion sensing/gesturing device or elements, or local and/or remote servers may be implemented using one or more components of a computer system as described in FIG. 9. More specifically, the systems described above in reference to FIGS. 1-4 may be at least partially implemented using computer system 900. As another example, the processes and protocols described in reference to FIGS. 5-8 may be at least partially implemented using sets of instructions that are executed using computer system 900.

Computer system 900 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 900 may include at least one communication bus 905, one or more processors 910, a system memory 915, a read-only memory (ROM) 920, permanent storage devices 925, input devices 930, output devices 935, various other components 940 (e.g., a graphics processing unit), and one or more network interfaces 945.

Bus 905 represents all communication pathways among the elements of computer system 900. Such pathways may include wired, wireless, optical, and/or other appropriate communication pathways. For example, input devices 930 and/or output devices 935 may be coupled to the system 900 using a wireless connection protocol or system.

The processor 910 may, in order to execute the processes of some embodiments, retrieve instructions to execute and/or data to process from components such as system memory 915, ROM 920, and permanent storage device 925. Such instructions and data may be passed over bus 905.

System memory 915 may be a volatile read-and-write memory, such as a random access memory (RAM). The system memory may store some of the instructions and data that the processor uses at runtime. The sets of instructions and/or data used to implement some embodiments may be stored in the system memory 915, the permanent storage device 925, and/or the read-only memory 920. ROM 920 may store static data and instructions that may be used by processor 910 and/or other elements of the computer system.

Permanent storage device 925 may be a read-and-write memory device. The permanent storage device may be a non-volatile memory unit that stores instructions and data even when computer system 900 is off or unpowered.

Computer system 900 may use a removable storage device and/or a remote storage device as the permanent storage device.

Input devices 930 may enable a user to communicate information to the computer system and/or manipulate various operations of the system. The input devices may include keyboards, cursor control devices, audio input devices and/or video input devices. Output devices 935 may include printers, displays, and/or audio devices. Some or all of the input and/or output devices may be wirelessly or optically connected to the computer system.

Other components 940 may perform various other functions. These functions may include performing specific functions (e.g., graphics processing, sound processing, etc.), providing storage, interfacing with external systems or components, etc.

Finally, as shown in FIG. 9, computer system 900 may be coupled to one or more networks 950 through one or more network interfaces 945. For example, computer system 900 may be coupled to a web server on the Internet such that a web browser executing on computer system 900 may interact with the web server as a user interacts with an interface that operates in the web browser. Computer system 900 may be able to access one or more remote storages 960 and one or more external components 965 through the network interface 945 and network 950. The network interface(s) 945 may include one or more APIs that may allow the computer system 900 to access remote systems and/or storages and also may allow remote systems and/or storages to access computer system 900 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 900 may be used in conjunction with some embodiments. Moreover, one of ordinary skill in the art will appreciate that many other system configurations may also be used in conjunction with some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure. For example, several embodiments were described above by reference to particular features and/or components. However, one of ordinary skill in the art will realize that other embodiments might be implemented with other types of features and components, and that the disclosure is not to be limited by the foregoing illustrative details.

I claim:

1. An automated method performed by a first unmanned aerial vehicle (UAV) for determining a beam direction for communication with a second UAV, the method comprising:
   dividing a space around the first UAV into a plurality of sub-regions, the plurality of sub-regions extending out radially from the first UAV, wherein each sub-region in the plurality of sub-regions is associated with one of at least one antenna sub-apertures of the first UAV that generates an antenna beam that adequately covers the sub-region;
   selecting the beam direction by iteratively performing, until the first UAV determines a specified criteria is met by a signal received from the second UAV:
      selecting a selected sub-region from among the plurality of sub-regions;
      pointing a signal toward the selected sub-region using the one of the at least one antenna sub-apertures associated with the selected sub-region;
      determining whether a signal is received from another UAV while the signal is pointed to the selected sub-region; and
      determining whether the signal received from the other UAV meets the specified criteria.

2. The automated method of claim 1, wherein the first UAV is in listening mode and:
   the signal is pointed toward each selected sub-region for at least one interval comprising a number of time slots equal to the number of the plurality of sub-regions; and
   the first UAV remains in listen mode for at least one frame comprising a number of intervals equal to the number of the plurality of sub-regions.

3. The automated method of claim 2, wherein the first UAV is in inquire mode,
   the signal is pointed toward each selected sub-region for at least one time slot during an interval comprising a number of time slots equal to the number of sub-regions; and
   the first UAV remains in inquire mode for at least one frame comprising a number of intervals equal to the number of sub-regions.

4. The automated method of claim 3, further comprising using a dedicated system configuration radio link to determine whether the first UAV is in listen mode or inquire mode.

5. The automated method of claim 4 further comprising receiving, from the ground terminal, position and orientation information associated with at least one other UAV.

6. The automated method of claim 1 further comprising:
   determining a location of a ground terminal;
   determining a position and orientation of the first UAV; and
   sending the position and orientation of the first UAV to the ground terminal.

7. The automated method of claim 1 further comprising the signal to the selected beam direction to establish a communication link with the second UAV.

8. An automated method performed by a ground terminal for determining a beam direction for communication within an aerial communication system, the method comprising:
   dividing, at a ground terminal, a space around an aerial platform into a plurality of sub-regions, the plurality of sub-regions extending out radially from the aerial platform, wherein each sub-region in the plurality of sub-regions is associated with one of at least one antenna sub-apertures that generates an antenna beam that covers the sub-region; and
   selecting the beam direction for the ground terminal by iteratively performing, until a signal from the aerial platform meets specified criteria:
      selecting a selected sub-region from among the plurality of sub-regions;

searching, within the selected sub-region, for a signal from the aerial platform using the one of the at least one antenna apertures associated with the selected sub-region;

determining whether a signal has been detected at the ground terminal; and determining whether the detected signal meets the specified criteria.

9. The automated method of claim 8 further comprising:

sending a confirmation message to the aerial platform; and pointing a signal to establish a communication link with the aerial platform.

10. The automated method of claim 8 wherein the each selected sub-region is searched for at least one interval comprising a number of time slots equal to the number of sub-regions.

11. The automated method of claim 10, wherein the selected sub-region is searched for at least one frame comprising a number of intervals equal to the number of sub-regions.

12. The automated method of claim 8, wherein the aerial platform is an unmanned drone.

13. The automated method of claim 8, wherein the aerial communications system comprises at least one gateway and a plurality of aerial platforms.

* * * * *